US008305512B2

(12) United States Patent
Ju et al.

(10) Patent No.: US 8,305,512 B2
(45) Date of Patent: Nov. 6, 2012

(54) DISPLAY APPARATUS

(75) Inventors: Jun-Hwan Ju, Pyeongtaek-si (KR); Tae-Yong Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 337 days.

(21) Appl. No.: 12/636,941

(22) Filed: Dec. 14, 2009

(65) Prior Publication Data
US 2011/0013346 A1   Jan. 20, 2011

(30) Foreign Application Priority Data
Jul. 17, 2009   (KR) .................. 10-2009-0065538

(51) Int. Cl.
*G02F 1/1333* (2006.01)

(52) U.S. Cl. ........................................................ 349/58

(58) Field of Classification Search ................. None
See application file for complete search history.

(56) References Cited

U.S. PATENT DOCUMENTS

| | | | | | |
|---|---|---|---|---|---|
| 4,185,220 | A | * | 1/1980 | Oberg | 313/478 |
| 5,894,192 | A | * | 4/1999 | Grabis | 313/478 |
| 7,667,786 | B2 | * | 2/2010 | Nouchi et al. | 349/58 |
| 7,834,962 | B2 | * | 11/2010 | Satake et al. | 349/110 |
| 2002/0003711 | A1 | * | 1/2002 | Hashimoto et al. | 362/551 |
| 2005/0083465 | A1 | * | 4/2005 | Niiyama et al. | 349/122 |
| 2006/0209502 | A1 | * | 9/2006 | Sakata et al. | 361/681 |
| 2007/0176309 | A1 | * | 8/2007 | Kanbayashi | 264/1.1 |
| 2008/0158445 | A1 | * | 7/2008 | Yokawa | 348/836 |
| 2008/0297999 | A1 | | 12/2008 | Choi | 361/681 |
| 2008/0298001 | A1 | | 12/2008 | Choi | 361/681 |
| 2009/0231412 | A1 | * | 9/2009 | Derocher et al. | 348/14.07 |
| 2009/0303675 | A1 | * | 12/2009 | Kuang et al. | 361/679.22 |
| 2010/0043965 | A1 | | 2/2010 | Kamiya et al. | 156/275.5 |
| 2011/0205454 | A1 | * | 8/2011 | Kim et al. | 348/836 |

FOREIGN PATENT DOCUMENTS

| | | | |
|---|---|---|---|
| EP | 2 133 856 A1 | | 12/2009 |
| JP | 5-188873 A | * | 7/1993 |
| JP | 10-260398 A | * | 9/1998 |
| JP | 2003-131580 | | 5/2003 |
| JP | 2004-144969 A | | 5/2004 |
| KR | 10-2008-0022956 A | | 3/2008 |
| KR | 10-2008-0106605 A | | 12/2008 |
| WO | WO 02/063874 A1 | | 8/2002 |
| WO | WO 2008/123611 A1 | | 10/2008 |

OTHER PUBLICATIONS

PCT International Search Report dated Apr. 2, 2010 for Application No. PCT/KR2009/007149.
European Search Report dated May 10, 2011 issued in Application No. 09 82 9866.

* cited by examiner

*Primary Examiner* — Mike Stahl
(74) *Attorney, Agent, or Firm* — KED & Associates LLP

(57) ABSTRACT

A display apparatus is provided that includes a display module, and a front panel disposed at a front of the display module. A distance between the display module and the front panel is 3 mm or less, and the front panel is formed in a shape that protrudes in an opposite direction of the display module.

19 Claims, 9 Drawing Sheets

DISPLAY APPARATUS

BACKGROUND OF THE INVENTION

1. Field of the Invention

The present invention relates to a display apparatus.

2. Description of the Related Art

Generally, various electronic devices, such as a mobile communication terminal, a digital camera, a notebook, a monitor, a TV, etc., include a display apparatus that displays images.

With the development of an information-oriented society, a demand for various types of display apparatus has been increased. Accordingly, various display apparatuses, such as a liquid crystal display apparatus (LCD), a plasma display panel (PDP), an electro luminescent display (ELD), a vacuum fluorescent display (VFD), etc., have been researched and used recently.

SUMMARY OF THE INVENTION

It is an object of the present invention to provide a display apparatus that can improve image quality of a display image.

A display apparatus according to an embodiment of the present invention includes: a display module; and a front panel disposed in front of the display module, wherein an distance between the display module and the front panel is 3 mm or less and the front panel is formed in a shape protruded in an opposite direction of the display module.

A display apparatus according to another embodiment of the present invention includes: a display module; and a front panel disposed in front of the display module, wherein an distance between the display module and the front panel is 3 mm or less, the distance between the display module and the front panel is a value of 2 or more, the front panel, and a difference between a maximum value and a minimum value of the distance is 3 mm to 10 mm.

DETAILED DESCRIPTION OF THE PREFERRED EMBODIMENT

Hereinafter, a display apparatus according to the present invention will be described in detail with reference to the accompanying drawings.

Figure 1:
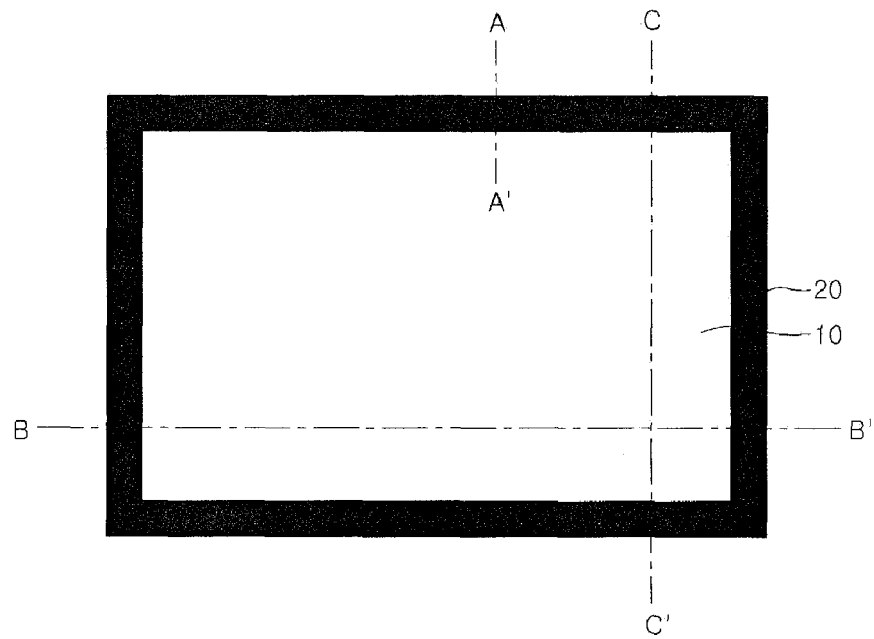
FIG. 1 is a diagram schematically illustrating a shape of a front side of a display apparatus.

FIG. 1 schematically illustrates a shape of a front side of a display apparatus, wherein the display device may be configured to include a display area and a non-display area.

Referring to FIG. 1, the display apparatus may include a display area 10 where images are displayed and a non-display area 20 where images are not displayed. The non-display area 20, which has a shape surrounding the display area 10, is formed in the outer area of the display apparatus and the non-display area 20 may be formed with a light shielding pattern.

The light shielding pattern formed in the non-display area 20 can shield light from passing through the outer area of the display apparatus, such that except for images to be displayed, structures provided in the outer area of the display apparatus, etc., cannot be seen by the user side.

In order for the light shielding pattern formed in the non-display area may have black color to effectively shield light and may be, for example, a black layer printed with black. As a result, when being seen from the user side, the non-display area 20 of the display apparatus may be shown as black color.

Meanwhile, when a power supply of the display apparatus is turned-off, the display area 10 where images are not displayed may be shown as black color similar to the non-display area 20. At this time, however, the reflection, absorption, scattering, etc., of external light incident from the outside may be differently generated in the display area 10 and the non-display area 20.

For example, a part of the external light may be reflected by the display panel, etc., provided in the display area 10 and most external light may be absorbed in the non-display area 20 on which the black layer is printed. As a result, when the power supply is turned-off, a visual difference can occur between the display area 10 and the non-display area 20 of the display apparatus. The above-mentioned visual difference may be distinctly displayed, in particular, at a boundary part of the display area 10 and the non-display area 20.

Figure 2:
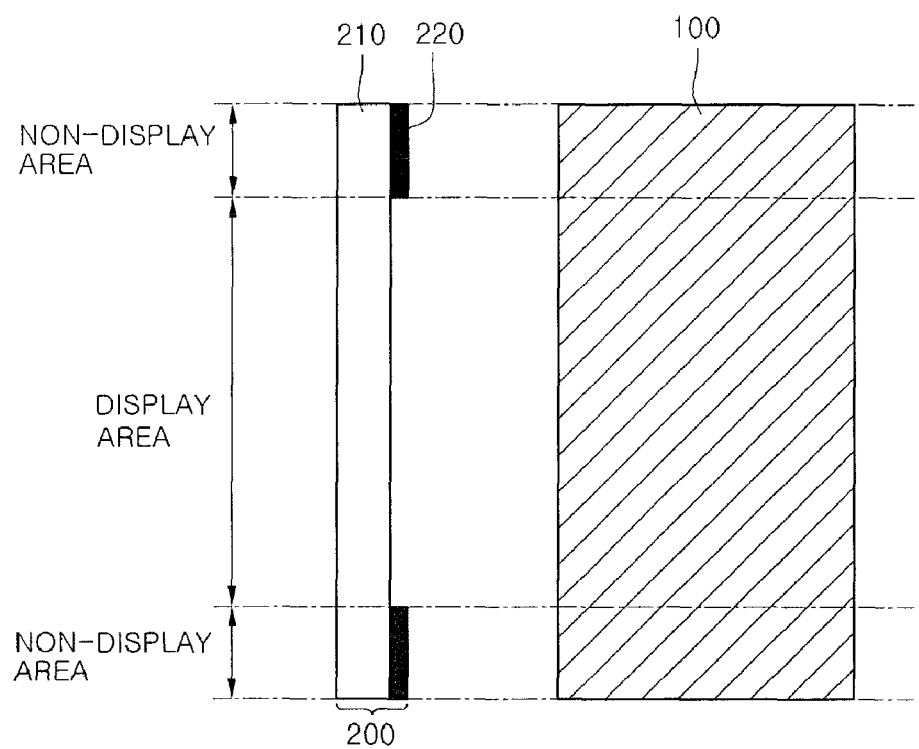
FIG. 2 is a cross-sectional view illustrating a cross section configuration of the display apparatus.

FIG. 2 is a cross-sectional view schematically showing a configuration of the display apparatus. The display apparatus according to the present invention may include a display module 100 and a front panel 200 that is disposed at a front side of the display module 100. Referring to FIG. 2, the display module 100 emits light in a front direction where the front panel 200 is disposed, thereby displaying images. For example, the display module 100 may be a liquid crystal display module and may include a liquid crystal panel (not shown) and a backlight unit (not shown). The liquid crystal panel (not shown) can display images using light provided from the backlight unit (not shown). To this end, the liquid panel (not shown) may include a liquid crystal layer and a TFT substrate and a color filter substrate that faces each other, putting the liquid crystal layer therebetween.

However, the embodiments according to the present invention are not limited to the above-mentioned liquid crystal display apparatus and can be applied to various display apparatuses, such as a plasma display panel (PDP), an electro luminescent display (ELD), a vacuum fluorescent display (VFD), etc.

The front panel 200 is disposed at the front side of the display module 100 at a predetermined distance, protects the display module 100 from an external impact, and transmits light emitted from the display module 100 so that images displayed in the display module 100 can be seen from the external.

For example, the front panel 200 may be a transparent window made of a glass material or a plastic material, such as acrylic, etc., having impact resistance and light transmission.

In addition, the front panel 200 may include a plurality of function layers, such as an anti-reflective layer, a light characteristic layer, an EMI shielding layer, a near infrared (hereinafter, referred to as "NIR") shielding layer, etc.

As shown in FIG. 2, the front panel 200 may include the display area that transmits light emitted from the display module 100 and displays images and a light shielding pattern 210 that includes the non-display area surrounding the display area and shields light to the non-display area of the front panel 200.

Meanwhile, in the present embodiment, a separate front cabinet, which protects the display module, is removed and the front panel 200 may be configured to form the entire appearance seen from the front side of the display apparatus.

Figure 3:
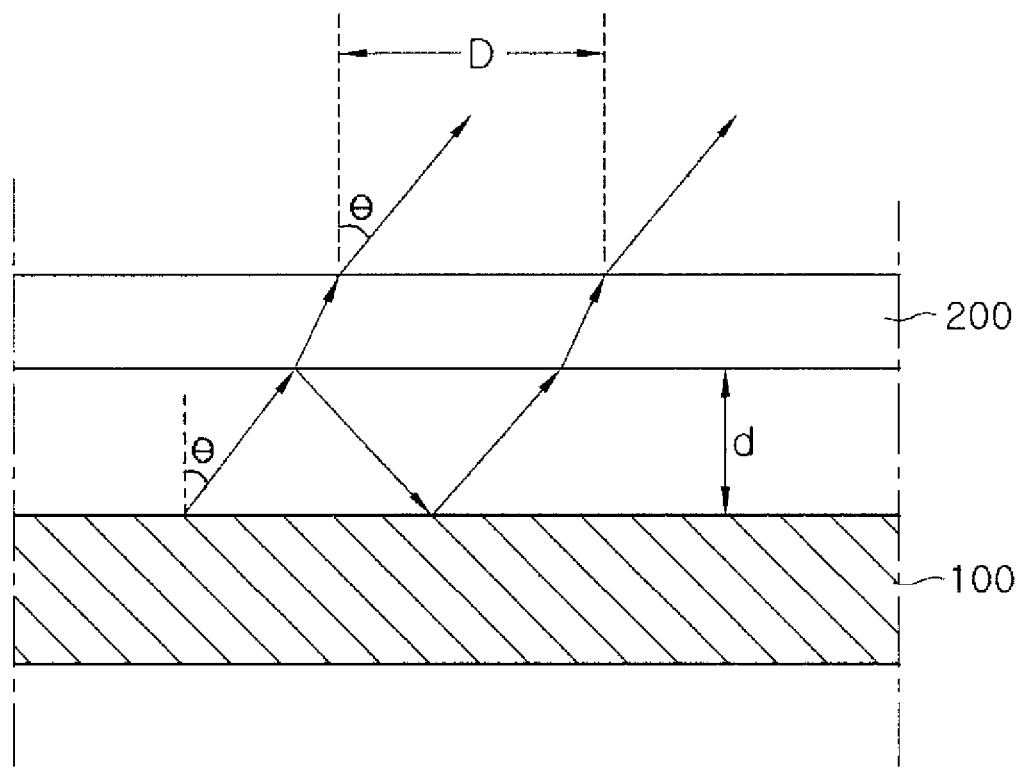
FIG. 3 is a cross-sectional view for explaining an overlay phenomenon occurring in the display apparatus.

FIG. 3 is a cross-sectional view schematically illustrating the display module 100 and a part of the front panel 200 provided in the display apparatus and the display module 100 and the front panel 200 may be disposed to be spaced from each other at a predetermined distance d. Referring to FIG. 3, light emitted from the display module 100, more specifically, the panel provided in the display module 100 transmits to the front panel 200 and is emitted to the user, such that the user can view images displayed in the display module 10.

Meanwhile, a part of light emitted from the display module 100 is reflected from the front panel 200 and progresses to the display module 100 and is again reflected from the display module 100, transmitted to the front panel 200, and then is emitted to the user side.

As described above, an overly phenomenon that the displayed image is seen as a double image by the user side can occur by light reflected between the display module 100 and the front panel 200.

For example, when a viewing angle of the user is assumed to be θ, a distance of the double image can be obtained by the following Equation 1.

$$D = 2d \tan \theta \qquad \text{[Equation 1]}$$

Therefore, as the distance d between the display module 100 and the front panel 200 is increased, the distance of the double image is increased, such that the overlay phenomenon can be seen in the user side. To the contrary, as the distance d between the display module 100 and the front panel 200 is reduced, the distance D of the double image is reduced.

Meanwhile, the following Table 1 is experimental results obtained by measuring whether the user recognizes the overlay phenomenon according to the change in the distance D of the double image. That is, whether experimenters recognize the overlay phenomenon while the distance D of the double image is reduced by 0.5 mm from 10 mm is measured. Table 1 expresses a ratio of experimenters, who recognize the overlay phenomenon in the corresponding distance D of the double image according to the experimental results, as a percentage. In addition, FIG. 4 is a graph illustrating the experimental results of Table 1.

TABLE 1

| Distance of Double image (D) | recognizing rate of overlay phenomenon |
|---|---|
| 10 mm | 100% |
| 9.5 mm | 100% |
| 9 mm | 99% |
| 8.5 mm | 99% |
| 8 mm | 88% |
| 7.5 mm | 85% |
| 7 mm | 74% |
| 6.5 mm | 49% |
| 6 mm | 1% |
| 5.5 mm | 1% |
| 5 mm | 0% |
| 4.5 mm | 0% |
| 4 mm | 0% |

Figure 4:
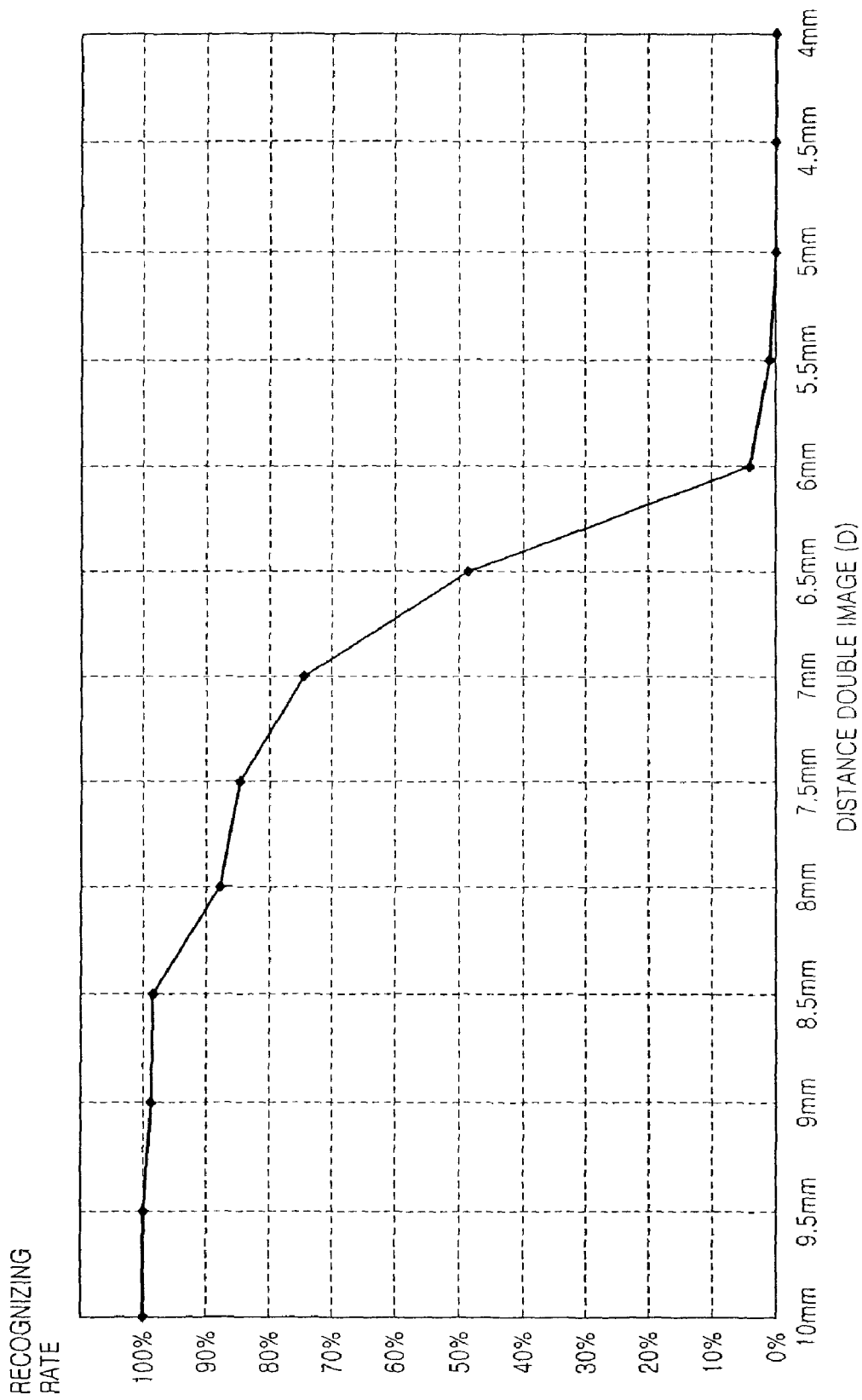
FIG. 4 is a graph illustrating experimental results of Table 1.

Referring to FIG. 4, when the distance D of the double image is in a range of 10 mm to 8.5 mm, most experimenters recognize the overlay phenomenon and as the distance of the double image is reduced to 8.5 mm or less, it can be confirmed that the ratio of the experimenters, who recognize the overlay phenomenon, is reduced. In addition, when the distance D of the double image is reduced to 6.5 mm or less, it can be confirmed that the experimenters of 50% or more do not recognize the overlay phenomenon.

In particular, referring to Table 1 and FIG. 4, when the distance of the double image reaches 6 mm, the ratio of the experimenters, who recognize the overlay phenomenon, is suddenly reduced, only the experimenters of 4% can recognize the overlay phenomenon.

Therefore, when the distance D of the double image is 6 mm or less, most users cannot recognize the overlay phenomenon according to the double image, such that the deterioration of the image quality, which is visually felt by the user according to the overlay phenomenon, can be improved.

In addition, assuming that the viewing angle θ of the user is 45° or less in Equation 1, the distance D of the double image may be in the range of the following Equation 2.

$$0 \leq D \leq 2d \qquad \text{[Equation 2]}$$

According to Equation 2, when the distance d between the display module 100 and the front panel 200 is 3 mm or less, the distance D of the double image can be maintained at 6 mm or less.

In conclusion, the user with the viewing angle θ of 45° or less cannot visually recognize the overlay phenomenon, such that it is preferable to maintain the distance d between the display module 100 and the front panel 200 at 3 mm or less in order to improve the deterioration of the image quality due to the overlay phenomenon.

Meanwhile, the shape of the front panel 200 can be deformed by heat generated when the display module 100 is driven. As described above, when the front panel 200 is closely positioned to the display module 100 at 3 mm or less, the front panel 200 can contact the display module 100 by the deformation.

In other words, the front panel 200 can be deformed to be bent in the display module 100 direction by heat generated from the display module 100, such that a part of the front panel 200, for example, a central part can contact the display module 100.

As described above, a pattern similar to a rainbow can be displayed on the display screen corresponding to the contact part due to the contact of the display module 100 and the front panel 200, thereby deteriorating the image quality of the display image.

According to the embodiment of the present invention, the front panel 200 has a shape protruded in an opposite direction of the display module 100, such that it is preferable to prevent the contact of the front panel 200 to the display module 100 by the deformation due to heat generated at the time of driving.

Figure 5:
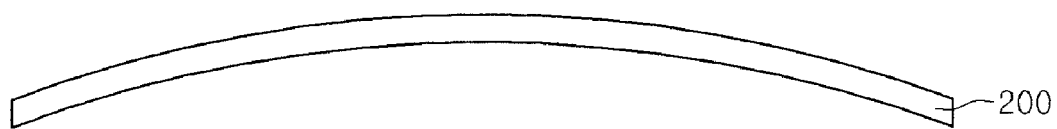
FIG. 5 is a cross-sectional view illustrating a shape of a front panel included in the display apparatus according to embodiments of the present invention.

FIG. 5 is a cross-sectional view illustrating the shape of the front panel included in the display apparatus according to an embodiment of the present invention. Referring to FIG. 5, it is preferable that the front panel 200 is made of a glass or plastic material and is formed to have a convex shape in one direction.

For example, a shape of a mold to manufacture the front panel 200 can be manufactured to correspond to the shape of the front panel 200 shown in FIG. 5. The front panel 200 can be manufactured to have a shape protruded in one direction by the mold.

Meanwhile, after the front panel 200 in a flat shape by the mold is formed, the cooling speed of each part is different, such that the front panel 200 can be manufactured to have a shape protruded in one direction as shown in FIG. 5. In more detail, the cooling is slowly performed as going to the central part of the front panel 200, such that the central part of the front panel 200 may have a convex shape.

Further, the front panel 200 is formed and then applied with a pressure, such that the front panel 200 can be manufactured to have a convex shape.

As shown in FIG. 5, the front panel 200 is positioned at the front side of the display module 100 so that a convex surface of the front panel 200 faces the front side, that is, the opposite direction of the display module 100. The front panel 200 can reduce the phenomenon that the front panel 200 is bent in the display module 100 direction by heat generated when the display module 100 is driven, by forming the front panel 200 to be protruded in an opposite direction of the display module 100.

Figure 6:
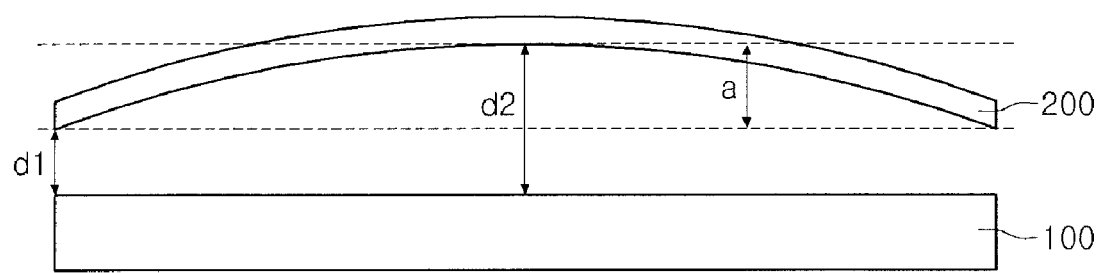
FIG. 6 is a cross-sectional view illustrating a first embodiment of a shape of a front panel.

FIG. 6 illustrates a first embodiment of the shape of the front panel 200 and among components of the display apparatus shown in FIG. 6, the description of the same components as ones described with reference to FIGS. 1 to 5 will be omitted.

Referring to FIG. 6, the front panel 200 is formed to be protruded in an opposite direction of the display module 100 and the protruded degree of the front panel 200 can be defined by a bending amount of the front panel 200. As shown in FIG. 6, the front panel 200 has a shape protruded in one direction, such that the distance between the display module 100 and the front panel 200 may have different values according to the position.

The bending amount, which indicates a protruded degree of the front panel 200, can be defined by a difference (d2−d1) between a maximum value d2 and a minimum value d1 between the display module 100 and the front panel 200.

Meanwhile, the distance d between the display module 100 and the front panel 200 may have the minimum value d1 at an end of the front panel 200 and have the maximum value d2 at the central part. In this case, the bending amount of the front panel 200 can be defined by a difference a between the position of the end and the position of the central part.

In addition, as described with reference to FIGS. 3 and 4, the distance d between the display module 100 and the front panel 200 can be defined by the distance d1 between the end of the front panel 200 and the display module 100 shown in FIG. 6.

In other words, in the shape of the front panel 200 as shown in FIG. 6, the distance d1 between the display module 100 and the end of the front panel 200 may be 3 mm or less in order to improve the deterioration of the image quality according to the overlay phenomenon.

Meanwhile, the interference of light reflected from the display module 100 and the front panel 200, respectively, can occur as the distance d between the display module 100 and the front panel 200 is reduced. The interference phenomenon can be classified into cancellation interference and constructive interference. In the case of the cancellation interference, the phase of light is offset from each other to show darkly and in the case of the constructive interference, the phase of light is combined with each other to show brightly. As described above, a Newton's ring phenomenon of a circle pattern can occur by the interference of the reflective light as described above and the Newton's ring phenomenon makes the brightness of the display image non-uniform, thereby making it possible to deteriorate the image quality.

The following Table 2 is results obtained by measuring whether the Newton's ring phenomenon according to the change in the distance d between the display module 100 and the front panel 200 occurs.

TABLE 2

| Distance (d) | Occurrence or not of Newton's ring |
| --- | --- |
| 3 mm | X |
| 2.8 mm | X |
| 2.6 mm | X |
| 2.4 mm | X |
| 2.2 mm | X |
| 2.0 mm | X |
| 1.8 mm | X |
| 1.6 mm | X |
| 1.4 mm | ○ |
| 1.2 mm | ○ |
| 1.0 mm | ○ |
| 0.8 mm | ○ |

Referring to Table 2, when the display module 100 and the front panel 200 are very adjacently disposed to each other at a distance d of 1.4 mm or less, the Newton's ring phenomenon can occur by the interference of light reflected from the display module 100 and the front panel 200, respectively.

Meanwhile, when considering heat transferred to the front panel 200 and the corresponding increased temperature of the front panel 200 and the material of the front panel 200, that is, a glass or plastic material at the time of driving the display apparatus, the experimental results show that the central part of the front panel 200 can be bent in the display module 100 direction up to 4.6 mm to the maximum at the time of driving the display apparatus.

When the central part of the front panel 200 is bent by x in the display module 100 direction at the time of driving the display apparatus, the distance d2 between the central part of the front panel 200 and the display module 100 can be calculated by the following Equation 3.

$$d2 = a + d1 - x \qquad \text{[Equation 3]}$$

In Equation 3, when 4.6 mm, which is a maximum value of a degree that the central part of the front panel 200 is bent at the time of driving the display apparatus, is substituted into x, 3 mm, which is a maximum value of the distance d1 between the display module 100 and the end of the front panel 200, is substituted into d1, and 1.4 mm, which is a minimum value of the distance d to reduce the Newton's ring phenomenon, is substituted into d2, a may be 3 mm.

Therefore, considering the occurrence of the Newton's ring phenomenon when the distance d1 between the display module 100 and the end of the front panel 200 is 3 mm or less and the distance d between the display module 100 and the front panel 200 is 1.4 mm or less as described above, the bending amount a of the front panel 200 may be 3 mm or more in order to reduce the Newton's ring phenomenon while improving the image deterioration due to the overlay phenomenon.

Meanwhile, when the front panel 200 has an excessively convex shape, the image quality of the display image can be deteriorated by the non-uniformity of the distance d between the display module 100 and the front panel 200.

In more detail, the experimental results show that the deterioration of the image quality, such as the case where the image of the screen central part is visually seen to the user as a protruded shape, etc., when the difference $d_2-d_1$ between the minimum value $d_1$ and the maximum value $d_2$ of the distance d between the display module 100 and the front panel 200 is 5.4 mm or more.

In Equation 3, when 5.4 mm is substituted into $(d_2-d_1)$ and 4.6 mm, which is a maximum value of a degree that the central part of the front panel 200 is bent at the time of driving the display apparatus, is substituted into x, a may be 10 mm.

Figure 7:
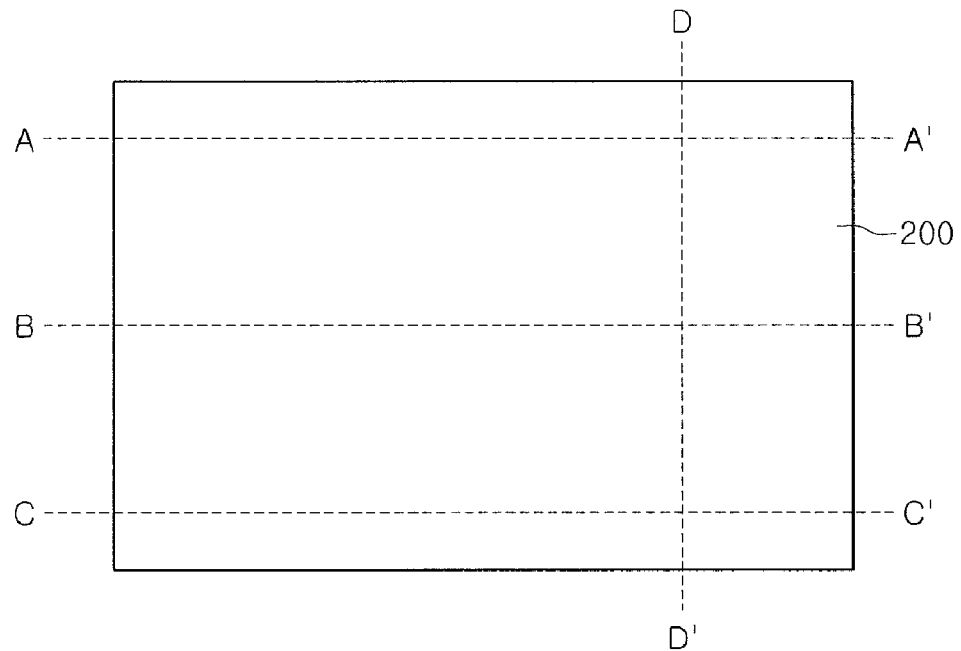
FIG. 7 is a plan view illustrating one embodiment of a shape of a front panel.

Therefore, as described above, when it is considered that the distance $d_1$ between the display module 100 and the end of the front panel 200 is 3 mm or less and at the time of driving the display apparatus, the central part of the front panel 200 is bent up to 4.6 mm to the maximum, the bending amount of the front panel 200, for example, the distance a between the end of the front panel 200 and the central part may be 10 mm or less in order to reduce the image quality of the display image as described above. FIG. 7 is a plan view showing one embodiment of the shape of the front side of the front panel 200.

Figure 8A:
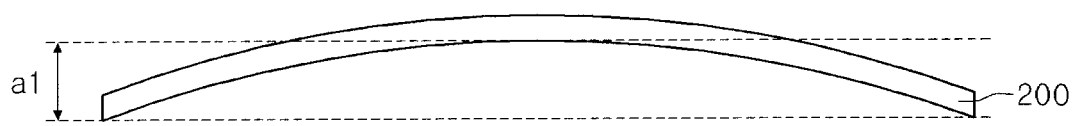
FIGS. 8A to 8C are cross-sectional views illustrating a second embodiment of a shape of a front panel.
Figure 8B:
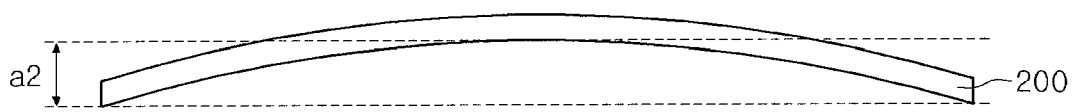
Figure 8C:
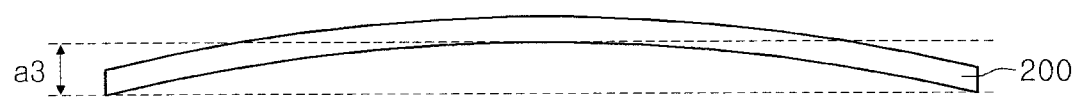

Referring to FIG. 7, the bending amount of the front panel 200, for example, the distance a between the end and central part of the front panel 200 may different. FIGS. 8A to 8C show a second embodiment of the shape of the front panel 200 according to the embodiment of the present invention and shows cross section shapes taken along lines A-A', B-B', and C-C' of the upper, center, and lower parts of the front panel 200 shown in FIG. 7, respectively.

Referring to FIGS. 8A to 8C, the front panel 200 may have a shape where the bending amount is reduced as going from the upper part to the lower part.

In other words, the front panel 200 may have the largest bending amount $a_1$ at the upper part and the smallest bending amount $a_3$ at the lower part and the bending amount $a_2$ at the center may have a value between two values $a_1$ and $a_3$.

As heat generated at the time of driving the display apparatus is progressed to the upper part, the upper part of the front panel may have higher temperature than the lower part of the panel 200. Therefore, as described above, the bending amount $a_1$ of the upper part of the front panel 200 is largest, such that the display module 100 and the front panel 200 may have a predetermined distance.

Meanwhile, to the contrary to one shown in FIGS. 8A to 8C, the front panel 200 may have a shape where the bending amount is reduced as going from the lower part to the upper part.

Figure 9:
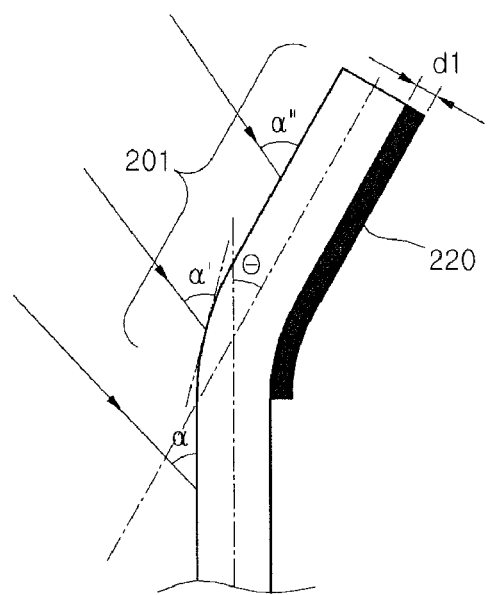
FIG. 9 is a cross-sectional view illustrating one embodiment of a shape of the outer area of the front panel.

FIG. 9 is a cross-sectional view showing one embodiment of a shape of an outer area of the front panel 200 and illustrates a shape of a cross section of the front panel 200 provided in a part taken along A-A' of the display apparatus.

Referring to FIG. 9, the outer area of the front panel 200 may have a shape bent by a predetermined angle in the back side direction.

For example, the outer area positioned on the upper part of the front panel 200 may be bent by .theta. in the back side direction and the back side part of the bending part 201 of the front panel 200 may be formed with a printing layer 220. As described above, the printing layer 220 may be a black layer that is formed in the non-display area of the display apparatus and is printed on the back side of the front panel 200 to shield light.

As shown in FIG. 9, as the outer area of the front panel 200 whose back side is formed with the black printing layer 210 is bent in a back side direction, a gradation effect that color is gradually dark as going to the outermost area can be generated at the bending part 201 of the front panel 200.

That is, when the external light is incident from the upper part of the front side, an incident angle $\alpha'$ of the external light to the bending part of the outer area of the front panel 200 is larger than the incident angle $\alpha$ of the outer area at the inner area. The incident angles $\alpha'$ and $\alpha''$ of the external light are large as going to the outermost at the curved surface of the bending part 201 and the absorption rate of the external light is gradually increased accordingly.

Therefore, the ratio of the external light reflected in the front direction is reduced at going to the outermost from the outer area where the bending part 201 of the front panel 200 is formed, such that when being seen from the front side by the user, the gradation effect that color is dark as going to the outermost from the outer area of the front panel 200 can be generated.

As described above, at least a part of the outer area of the front panel 200, more specifically, the gradation effect is generated at the boundary part of the display area 10 and the non-display area 20, such that the visual sense of difference between the display area 10 and the non-display area 20 of the display apparatus can be reduced, thereby making it possible not to visually expose the boundary of the display area 10 and the non-display area 20.

In other words, as described above, when the power supply is turned-off, since the display area 10 can be seen brighter than the non-display area by the reflection of the external light, etc., when being seen from the front side, the outer area of the front panel 200 including the non-display area 20 is bent to provide the gradation effect that color is dark as going to the outermost, thereby making it possible not to visually expose the boundary between the relatively bright display area 10 and dark non-display area 20.

Preferably, the brightness of the part adjacent to the display area 10 in the outer area of the front panel 200 can be set, for example, at the same level that cannot be visually identified by the user, similar to the brightness of the display area 10 when the power supply is turned-off.

Assuming that the incident angle $\alpha$ of the external light is about 45° to 60°, the color of the bending part 201 is gradually dark, such that the external light is incident in an orthogonal direction at the outermost area and is absorbed and in order to indicate the darkest color, it is preferable to bend the bending part 201 in the back side direction at an angle of 30° to 45°.

Meanwhile, when the thickness $d_1$ of the black printing layer 220 is increased, the refraction of light can be generated at the boundary surface of the printing layer 220 and the front panel 200 due to the difference in the refractive index between the printing layer 220 and the front panel 200. Therefore, the thickness $d_1$ of the printing layer 220 is 10 mm, such that it can prevent the refraction of light from generating at the boundary surface by the thickness of the printing layer 220 with different refractive index, thereby making it possible to reduce the difference between the actual color of the printing layer 220 and the color viewed from the front side.

The printing layer 220 formed on the back side of the front panel 200 may be formed with gradation. For example, the back side of the bending part 201 of the outer area of the front panel 200 may be formed with black printing layer 220 and the black printing layer 220 may be printed to have gradation that make color dark as it is adjacent to the outermost.

As described above, the black printing layer 220 with the gradation is formed on the rear surface of the bending part 201, the gradation effect can be more improved at the outer area of the front panel as described with reference to FIG. 9.

In other words, the visual sense of difference between the display area 10 and the non-display area 20 of the display apparatus can be more effectively improved by controlling the bending angle .theta. of the outer area of the front panel 200 and the gradation of the black printing layer 220 not to visually expose the boundary between the display area 10 and the non-display area 20 of the display apparatus.

In addition, the front panel 200 and the black printing layer 220 can be fixed to the display apparatus using an adhesive layer (not shown). For example, the adhesive layer (not shown) is formed between frames (not shown) positioned on a side of the display module and the front panel 200 to fix the front panel 200 to the frame (not shown), such that the front panel 200 can be disposed at the front side at a predetermined distance with respect to the display module 100.

Figure 10:
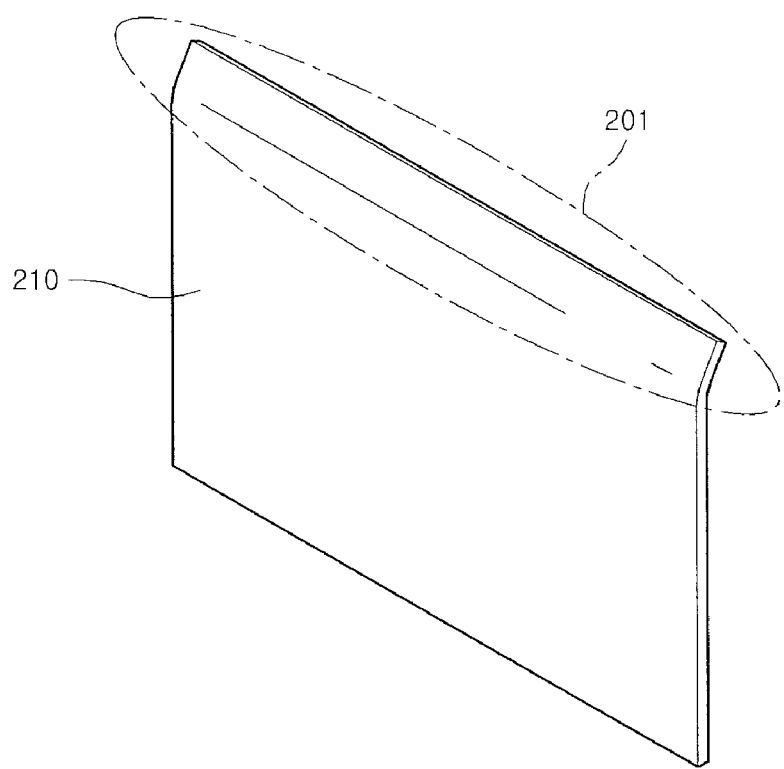
FIG. 10 is a perspective view illustrating one embodiment of the shape of the front panel shown in FIG. 9.

FIG. 10 is a perspective view of the embodiment of the shape of the front panel 200 shown in FIG. 9 and referring to FIG. 10, the front panel 200 may include the bending part 201 that is bent in the back side direction at the upper outer area, as described above.

In addition, although the embodiment of the present invention describes, by way of example, the case where the upper outer area of the front panel 200 is bent by a predetermined angle in the back side direction with reference to FIGS. 9 and 10, the present invention is not limited thereto. In other words, all or at least one of the outer areas positioned at the upper, lower, right, and left parts of the front panel 200 may be bent in the back side direction.

Figure 11:
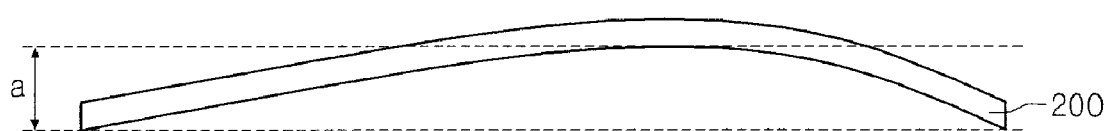
FIG. 11 is a cross-sectional view illustrating a third embodiment of a shape of a front panel.

FIG. 11 is a cross-sectional view of a third embodiment of the shape of the front panel 200 included in the display apparatus according to the present invention and illustrates cross section shapes of the front panel 200 shown in FIG. 7 that are cut up and down along line D-D'. Referring to FIG. 11, the front panel 200 may have a shape of the central part protruded in the up and down direction.

In other words, the front panel 200 may have the central part that is further protruded in an opposite direction of the display module 100 than left and right ends as shown in FIGS. 8A to 8C. Further, as shown in FIG. 11, the central part of the front panel 200 may have the shape that is further protruded in the opposite direction of the display module 100 than the upper and lower ends. Meanwhile, referring to FIG. 11, as described above, at least one of the upper, lower, right, and left parts of the front panel 200 may have a shape bent by a predetermined angle in the back side direction.

For example, when the upper outer area of the front panel 200 is bent by a predetermined angle in the back side direction, as shown in FIG. 11, the most protruded part of the front panel 200 may be more adjacently positioned to the upper part.

Meanwhile, in order to reduce the deterioration of the image quality of the display image while preventing the front panel 200 from contacting the display module 100, the bending amount of the front panel 200, that is, the distance a between the end and central part of the front panel 200 may be 3 mm to 10 mm.

Figure 12:
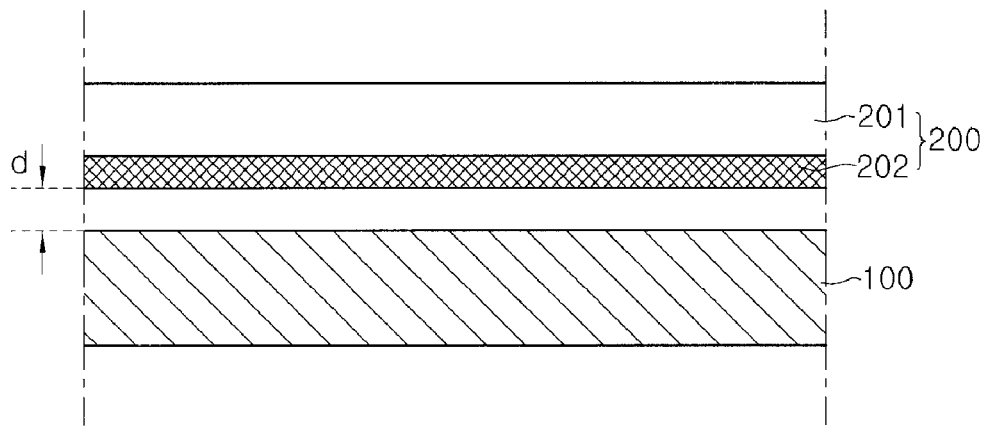
FIG. 12 is a cross-sectional view schematically illustrating embodiments of a configuration of a display apparatus including an anti glare layer.

FIG. 12 is a cross-sectional view schematically illustrating the embodiment of the structure of the display apparatus including the anti glare layer, wherein the surface of the anti glare layer is formed with prominence and depression, etc., thereby making it possible to scatter or diffused-reflect the incident light.

Referring to FIG. 12, the anti glare layer 202 scatters or diffused-reflect the light incident to the front panel 200, such that it can prevent the reflected light of the front panel 200 and the display module 100 from interfered with each other.

In other words, when the distance d between the display module 100 and the front panel 200 is 1.4 mm or less, the anti glare layer 202 is formed on the back side of the front panel 200, thereby making it possible to prevent the Newton's ring phenomenon from occurring.

In other words, according to one embodiment of the present invention, the distance d between the display module 100 and the front panel 200 is 3 mm or less, thereby making it possible to improve the deterioration of the image quality due to the overlay phenomenon and when the distance d is reduced to 1.4 mm or less, the anti glare layer 202 is provided, thereby making it possible to prevent deterioration of the image quality due to the Newton's ring phenomenon.

Unlike one shown in FIG. 12, the anti glare layer 202 may be formed on the front side of the display module 100, more specifically, the front substrate of the panel.

Figure 13:
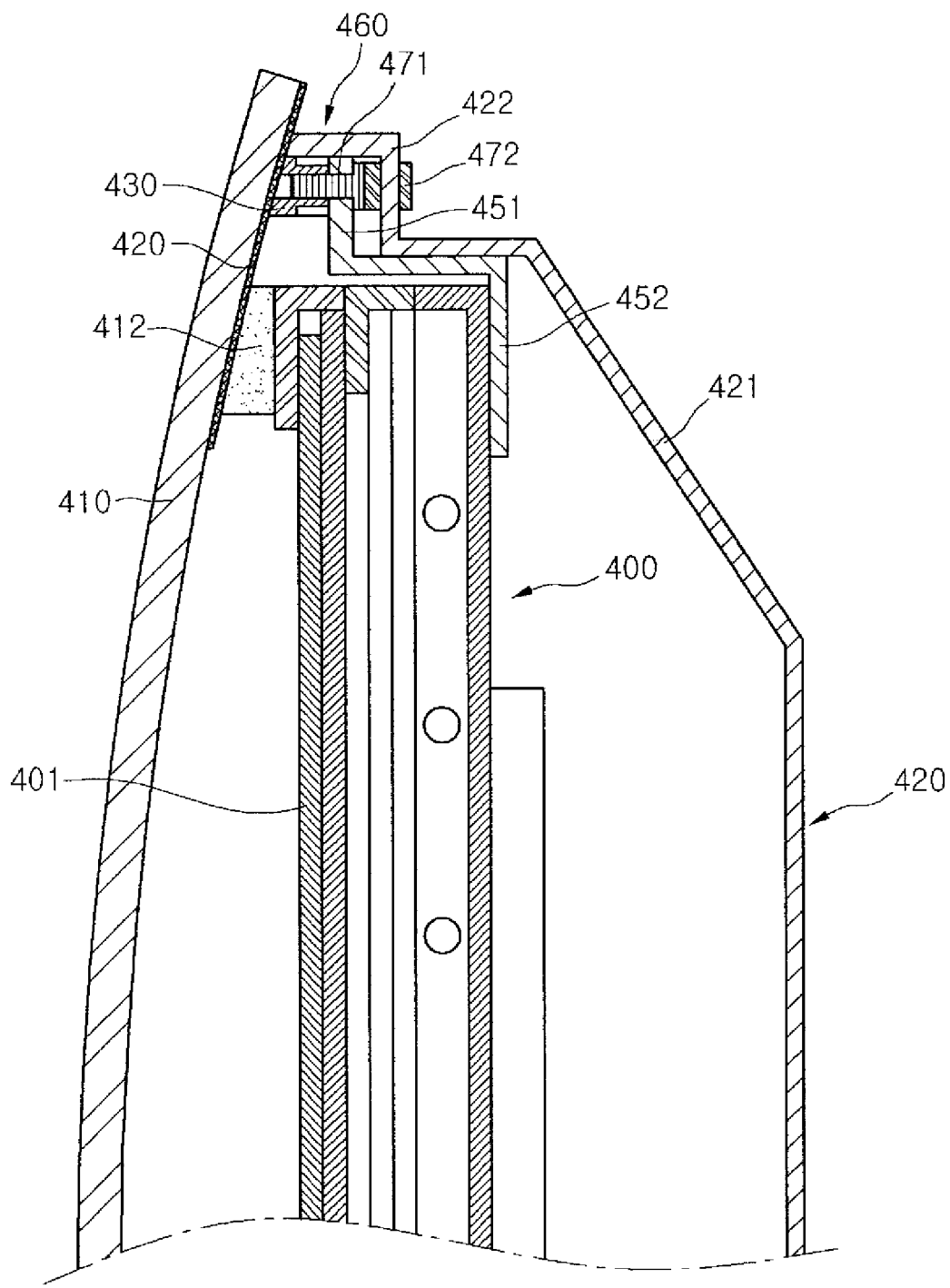
FIGS. 13 and 14 are cross-sectional views illustrating embodiments a configuration of the display apparatus according to the present invention.

FIG. 13 illustrates a cross-sectional view of the first embodiment of a configuration of the display apparatus according to the present invention.

Referring to FIG. 13, the display apparatus according to the present invention may include a front panel 410, a back cover 420, and a frame 460 that is interposed between the front panel 410 and the back cover 420 to form a part of the side appearance of the display apparatus. As described above, it is preferable that the front panel 410 has a shape protruded in an opposite direction of the display module 400.

The front panel 410 has a shape as shown in FIG. 13, such that the front panel 410 is bent inwardly by heat generated from the display module 400, thereby making it possible to prevent it from being contacted to the display module 400, more preferably, the liquid crystal panel.

In addition, the outer area of the back side of the front panel 410, in more detail, the back side of the part corresponding to the non-display area of the front panel 410 may be formed with the black printing layer 420 that shields light. The black printing layer 420 may be provided with a module seating part 412 in which a part of the display module 400 is seated.

The panel supporting part 430 may be formed with a first fixing hole 431 to which a connection member with the display module 400 is fixed and a second fixing hole 432 to which a back cover 420 is fixed.

The connection member may include a fixing part 451 that is fixed to the panel supporting part 430 and a module supporting part 452 that is formed to be bent with respect to the fixing part 451 to support an edge of the display module 400.

The fixing part 451 may be formed with a first fixing hole 453 through which a connection member 471 penetrates and a second fixing hole 454 through which a connection member 472 to fix the back cover 420 to the panel supporting part 430 penetrates.

The frame 460 may be formed with a first fixing hole 461 and a second fixing hole 462 that are aligned with the first and second fixing holes 431 and 432 of the panel supporting part 430 and an inserting hole 463 into which the panel supporting part 430 is inserted.

The edge part 422 that is formed to be extended to an outside from a body part of the back cover 420 contacts the frame 460 and the fixing hole 423 formed at the edge part 422 is aligned with the second fixing holes 432, 462, and 454 and the connection member 472 connected to the second fixing hole 432 can penetrate through the fixing hole 423 and the second fixing holes 462 and 454.

Figure 14:
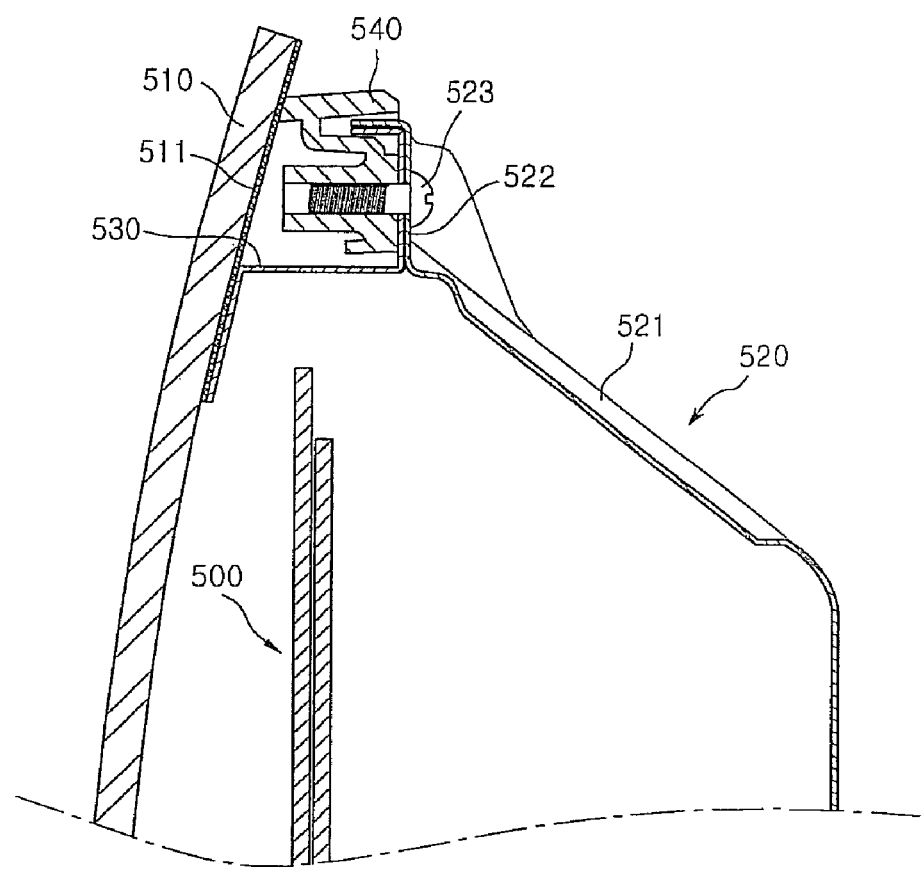

FIG. 14 illustrates a cross-sectional view of a second embodiment of a configuration of the display apparatus according to the present invention.

Referring to FIG. 14, a separate front cabinet, which protects the display module 500, is removed and a front panel 510 may be configured to form the entire appearance viewed from the front side of the display apparatus. In this case, a horizontal length and vertical length of the front panel 510 may be formed to be equal to or longer than the horizontal length and vertical length of the back cover 520.

The back cover 520 is disposed at the back side of the display module 500 including the panel to which the front substrate and the back substrate are connected and the display module 500 may be connected to a frame 540 that is fixed to the back side of the front panel 510.

As described above, it is preferable that the front panel 510 has a shape protruded in an opposite direction of the display module 500.

The front panel 510 has a shape as shown in FIG. 14, such that the front panel 510 is bent inwardly by heat generated from the display module 500, thereby making it possible to preventing it from being contacted to the display module 500.

In addition, the outer area of the back side of the front panel 510, in more detail, the back side of the part corresponding to the non-display area of the front panel 510 may be formed with the black printing layer 511 that shields light.

Meanwhile, the frame 540 may be fixed to the back side of the front panel 510 by an adhesive member (not shown), an adhesive, etc., and as the adhesive member, a double-sided tape may be used as one example. The frame 540 is positioned in an inner side by a predetermined distance toward the center of the front panel 510 in the process of fixing the frame 540 to the back side of the front panel 510, such that the frame 540 is not exposed when being viewed from the front side of the display apparatus.

The back cover 520 may include a body part 521 that forms an external appearance and an extending part 522 that is extended from the body part 521 and is connected to a supporter part 530. The back cover 520 may be connected to the frame 540 by the connection member 523. To this end, the extending part 522 may be formed with a connection hole to which the connection member 523 is grounded.

As described above, one end of the supporter part 530 is fixed and grounded to the back side of the front panel 510 and the other end of the supporter part 530 may be grounded to the extending part 522 of the back cover 520. Therefore, the supporter part 530 may electrically connect a ground part of an electromagnetic shielding layer that is formed on the back side of the front panel 510 and the back cover 520.

According to the embodiment of the present invention, the distance between the display module and the front panel is reduced, thereby reducing the overlay phenomenon and the diffused reflection phenomenon, which can occur in the display image and the thickness of the display apparatus is reduced, thereby improving the external appearance.

In addition, the front panel is formed to have a shape protruded in the opposite direction of the display module, such that the front panel is bent inwardly by heat generated at the time of driving, thereby making it possible to prevent it from being contacted to the display module and prevent a pattern similar to a rainbow from being displayed on the display screen.

Although the exemplary embodiments have been described and illustrated in the drawings and the description, this is described by way of example. Therefore, it will be appreciated to those skilled in the art that various modifications are made and other equivalent embodiments are available. Accordingly, the actual technical protection scope of the present invention must be determined by the spirit of the appended claims.

What is claimed is:

1. A display apparatus, comprising:
    a display module; and
    a front panel disposed at a front of the display module, wherein a distance between the display module and the front panel is 3 mm or less, wherein the front panel is formed in a shape that protrudes away from the display module, and wherein a light shielding pattern is formed on a back side of a part of the front panel that corresponds to a non-display area of the front panel.

2. The display apparatus according to claim 1, wherein the distance between the display module and the front panel varies according to a position, a minimum value being the 3 mm or less.

3. The display apparatus according to claim 2, wherein a maximum value of the distance is 10 mm.

4. The display apparatus according to claim 3, wherein the minimum value is at an end part of the front panel and the maximum value is at a central part of the front panel.

5. The display apparatus according to claim 1, wherein the front panel is formed in a shape, a cross section shape of which cut in a left and right direction protrudes away from the display module.

6. The display apparatus according to claim 1, wherein the front panel is formed in a shape, a cross section shape of which cut in an up and down direction protrudes away from the display module.

7. The display apparatus according to claim 1, wherein the front panel is formed in a shape, a central part of which protrudes further away from the display module than ends of upper, lower, left, and right parts of the front panel.

8. The display apparatus according to claim 1, wherein a bending amount of the front panel decreases as it extends from an upper part to a lower part.

9. The display apparatus according to claim 1, wherein at least one of outer areas positioned at upper, lower, left, or right parts of the front panel is bent toward the display module.

10. The display apparatus according to claim 9, wherein the at least one of the outer areas of the front panel is formed with a gradation of brightness.

11. The display apparatus according to claim 9, wherein the at least one of the outer areas of the front panel is bent by 30° to 45° toward the display module.

12. The display apparatus according to claim 1, wherein the distance between the display module and the front panel is 1.4 mm or less, and wherein a front surface of the display module is fondled with an anti glare layer.

13. A display apparatus, comprising:
    a display module; and
    a front panel that is disposed at a front of the display module, wherein a distance between the display module and the front panel is 3 mm or less, wherein the distance between the display module and the front panel varies according to a position, the minimum value being the 3 mm or less and a maximum value being 10 mm, and wherein a light shielding pattern is formed on a back side of a part of the front panel that corresponds to a non-display area of the front panel.

14. The display apparatus according to claim 13, wherein the minimum value is at an end part of the front panel and the maximum value is at a central part of the front panel.

15. The display apparatus according to claim 13, wherein the front panel is formed in a convex shape such that a central part protrudes further away from the display module than an end part of the front panel.

16. The display apparatus according to claim 13, wherein the front panel is formed in a shape such that a central part further protrudes away from the display module than ends of upper, lower, left, or right parts of the front panel.

17. The display apparatus according to claim 13, wherein at least one of the outer areas positioned at upper, lower, left, or right parts of the front panel is bent toward the display module.

18. The display apparatus according to claim 1, wherein the distance is greater than 0.

19. The display apparatus according to claim 13, wherein the minimum distance is greater than 0.

* * * * *